No. 621,939. Patented Mar. 28, 1899.
J. A. T. OBRIG.
EYEGLASS GUARD.
(Application filed Feb. 23, 1897)
(No Model.)
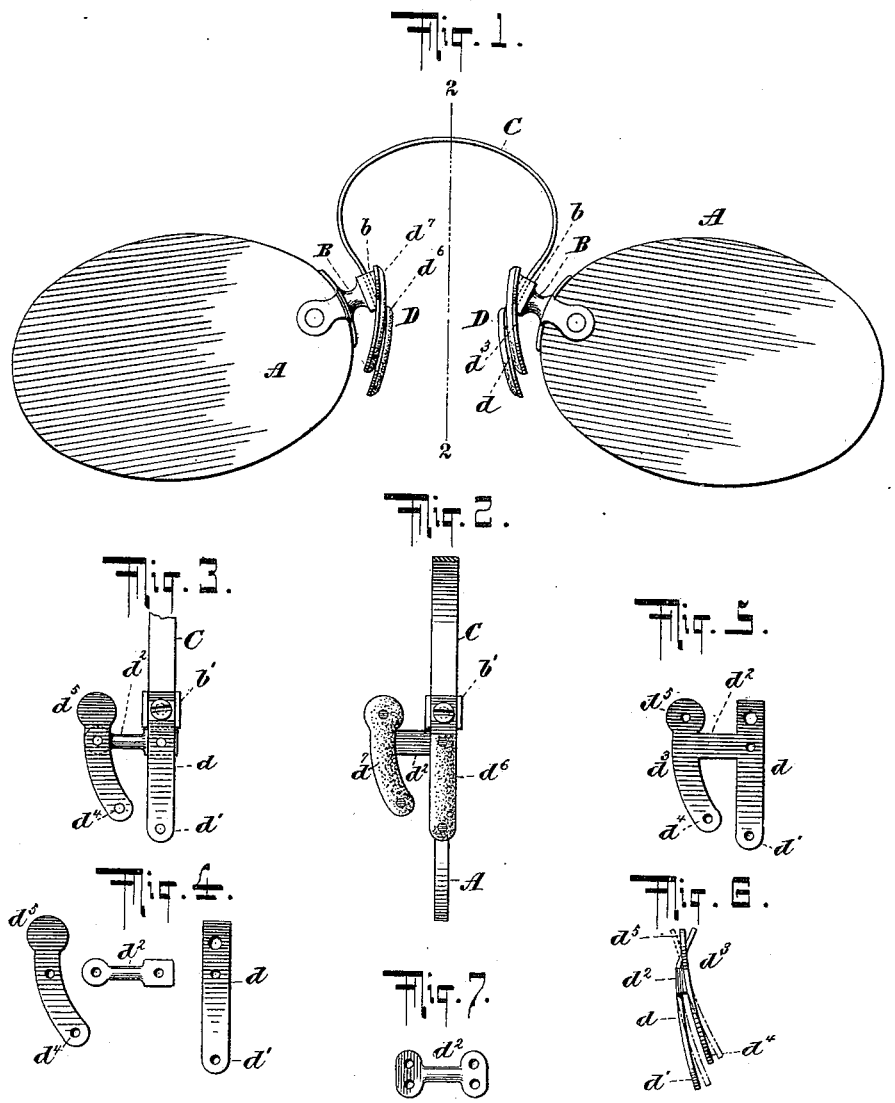

UNITED STATES PATENT OFFICE.

JACOB A. THEODORE OBRIG, OF NEW YORK, N. Y., ASSIGNOR TO GALL & LEMBKE, OF SAME PLACE.

EYEGLASS-GUARD.

SPECIFICATION forming part of Letters Patent No. 621,939, dated March 28, 1899.

Application filed February 23, 1897. Serial No. 624,583. (No model.)

*To all whom it may concern:*

Be it known that I, JACOB A. THEODORE OBRIG, a citizen of the United States, residing in the city of New York, (Brooklyn,) county of Kings, and State of New York, have made certain new and useful Improvements in Eyeglass-Guards, of which the following is a specification.

My invention relates to eyeglass-guards or nose-clamps, and has for its object to provide a guard having a double bearing, each part of which is adapted for independent adjustment.

This invention contemplates a nose-clamp or guard having bearings adapted for engagement or contact at two points on each side of the nose and which bearings are each capable of and adapted for independent adjustment at several points and in several directions.

Having reference to the accompanying drawings, which form part hereof, Figure 1 is a rear view of a pair of eyeglasses having my improved guards attached. Fig. 2 is a section view on line 2 2 of Fig. 1. Fig. 3 is a detail view of a guard made of three pieces. Fig. 4 shows the parts of Fig. 3 disassembled. Fig. 5 is a detail view of a guard made of one piece. Fig. 6 is an edge view of Fig. 5, illustrating the adjustability of the guard. Fig. 7 shows a form of link.

The lenses A are mounted in the usual frames B and connected by a spring C. Attached to each frame by any suitable means— as, for instance, a screw—is a guard D, comprised of a contact member $d$, lying in the same plane as the lens and having a free end $d'$, to which member is attached by a link $d^2$ another contact member or offset guard $d^3$, being shown as substantially comma-shaped and having two free ends $d^4$ and $d^5$. The members $d\ d^3$ are adapted to receive any suitable material $d^6\ d^7$, attached in any suitable manner, as by rivets, to form points for engagement or contact with the nose of the wearer. The frame B is made in the usual manner, with the box $b$ having two sides in the nature of flanges $b'$. The edge of the link $d^2$ is adapted to engage with the flange $b'$ of the box, and thereby steadies the guard.

The guard may be made from one piece of metal, as in Fig. 5, or from several pieces, as in Fig. 3, and the link $d^2$ in such case may be attached by two rivets or may be made so as to accommodate four rivets, as in Fig. 7.

The construction of the guard described and shown admits of ready and accurate adjustment in that the two members $d$ and $d^3$ may lie in the same plane, or in planes parallel to each other, or in planes at any angle to each other, or in planes which cut each other at any angle, and the free ends $d'\ d^4\ d^5$ may all be bent independently of each other, as shown in dotted lines in Fig. 6, to accommodate the guard to any shaped nose, and the advantages of the comma-shaped guard are: The greatest pressure exerted by the guard is at its upper end. This end is the head of the comma and is of large area. The lower end does not need to press as hard as does the upper end. It may be and is made narrower than the upper end. This is the tail of the comma. The tail is curved. This is not by arbitrary fancy, but by intention. It is curved in such a way that when on the wearer it will be as far from the eye as possible, thus avoiding any unpleasant drawing of the skin at the corner of the eye, and the curve also takes the end of the guard away from a part where it will have a poor hold and causes it to rest where the hold may be firmer. Thus it will be apparent that by this specific shape the area of bearing-surface is proportioned to the amount of work to be performed, and the form distributes the pressure where required and where it will secure the best results.

Having particularly described my invention, what I claim, and desire to secure by Letters Patent, is—

1. In an eyeglass-guard, two substantially parallel contact members, having three free and independently-adjustable ends, substantially as and for the purposes specified.

2. In an eyeglass-guard, two substantially parallel and independently-adjustable contact members, having three free and independently-adjustable ends, substantially as and for the purposes specified.

3. In an eyeglass the combination of a guard having two independently-adjustable members connected by a link, and a flanged box on the frame, all arranged so that the link engages the end of one of the flanges, substantially as and for the purposes specified.

4. A substantially comma-shaped offset eyeglass-guard.

5. In an eyeglass-guard the combination with a main guard of an offset substantially comma-shaped guard having two free and independently-adjustable ends connected thereto by its center through the medium of a link.

6. In an eyeglass-guard a contact member adapted to be secured to the eyeglass-frame and an offset comma-shaped member secured thereto by means of a link secured to it below its head.

7. A nose-piece for eyeglasses, consisting of the downwardly-extending guard having a long bearing-surface and adapted to be fastened at its upper end to the stud or frame of the lens, the horizontal connecting-arm and the inner guard, substantially parallel to and substantially equal in size with the guard, consisting of the upward-extending portion and the downwardly-extending portion, the parts being made of pliable material, substantially as set forth.

8. A nose-piece for eyeglasses, consisting of the downwardly-extending guard, having a long bearing-surface and adapted to be fastened at its upper end to the stud or frame of the lens, the pad on the inner face of said guard, the horizontal connecting-arm and the inner guard, substantially parallel to, and of substantially equal size with the guard, consisting of the upwardly-extending portion and the downwardly-extending portion and the pad on the inner face thereof, the parts and the pads being made of pliable material, substantially as set forth.

9. In eyeglasses the combination with the lenses and their connecting parts, of nose-pieces, one for each lens, consisting of the downwardly-extending guard, having a long bearing-surface and adapted to be fastened at its upper end to the stud or frame of the lens, the horizontal connecting-arm and the inner guard, substantially parallel to, and of substantially equal size with, the guard, consisting of the upwardly-extending portion and the downwardly-extending portion, these parts being made of pliable material, the parts of one nose-piece being opposite to, and in substantially the same plane with, the corresponding parts of the other nose-piece, substantially as set forth.

10. In eyeglasses, the combination with the lenses and their connecting parts, of nose-pieces, one for each lens consisting of the downwardly-extending guard, having a long bearing-surface and adapted to be fastened at its upper end to the stud or frame of the lens, the pad on the inner face of said guard, the horizontal connecting-arm, and the inner guard substantially parallel to and of substantially equal size with the guard, consisting of the upwardly-extending portion, and the downwardly-extending portion, and the pad on the inner face thereof, these parts and the pads being made of pliable material, the said parts of one nose-piece being opposite to and in substantially the same plane with the corresponding parts of the other nose-piece, substantially as set forth.

JACOB A. THEODORE OBRIG.

Witnesses:
EMIL LEMBKE,
CHARLES LEMBKE.